US012660846B2

(12) United States Patent
Schlemm

(10) Patent No.: US 12,660,846 B2
(45) Date of Patent: Jun. 23, 2026

(54) CIGARETTE MACHINE COMPRISING A SUCTION BELT CONVEYOR

(71) Applicant: TEWS Elektronik GmbH & Co. KG, Hamburg (DE)

(72) Inventor: Udo Schlemm, Hamburg (DE)

(73) Assignee: TEWS ELEKTRONIK GMBH & CO. KG, Hamburg (DE)

( * ) Notice: Subject to any disclaimer, the term of this patent is extended or adjusted under 35 U.S.C. 154(b) by 753 days.

(21) Appl. No.: 17/626,925

(22) PCT Filed: Apr. 23, 2020

(86) PCT No.: PCT/EP2020/061304
§ 371 (c)(1),
(2) Date: Jan. 13, 2022

(87) PCT Pub. No.: WO2021/008745
PCT Pub. Date: Jan. 21, 2021

(65) Prior Publication Data
US 2022/0354158 A1 Nov. 10, 2022

(30) Foreign Application Priority Data

Jul. 15, 2019 (DE) ...................... 20 2019 103 894.2

(51) Int. Cl.
*G01N 9/00* (2006.01)
*A24C 5/34* (2006.01)
(Continued)

(52) U.S. Cl.
CPC ............ *A24C 5/3412* (2013.01); *A24C 5/397* (2013.01); *A24C 5/399* (2013.01); *G01N 9/00* (2013.01); *G01N 22/04* (2013.01)

(58) Field of Classification Search
None
See application file for complete search history.

(56) References Cited

U.S. PATENT DOCUMENTS 4,941,482 A 7/1990 Heitmann et al.
4,966,170 A 10/1990 Keritsis et al.
(Continued)

FOREIGN PATENT DOCUMENTS

DE 3725366 A1 2/1989
DE 19754850 A1 6/1999
(Continued)

OTHER PUBLICATIONS

PCT/EP2020/061304; English translation of International Search Report; date of mailing Jan. 20, 2022 (11 pages).
(Continued)

*Primary Examiner* — Philip Y Louie
*Assistant Examiner* — Nicole A Szumigalski
(74) *Attorney, Agent, or Firm* — Barclay Damon LLP

(57) ABSTRACT

A cigarette machine comprises a suction belt conveyor including a rod guide channel, wherein the rod guide channel is delimited on one side by a material-conveying suction belt. Two channel cheeks are positioned opposite one another and configured to adjoin the rod guide channel An electromagnetic measuring apparatus comprises a resonator. The resonator comprises a first resonator half positioned on the side of the rod guide channel with the conveying suction belt, and a second resonator half of which is provided on the side which is situated opposite the first resonator half. The first resonator half is connected to the suction belt conveyor.

20 Claims, 4 Drawing Sheets

(51) Int. Cl.
   *A24C 5/39*       (2006.01)
   *G01N 22/04*      (2006.01)

(56)              References Cited

U.S. PATENT DOCUMENTS

| | | | | |
|---|---|---|---|---|
| 6,452,404 | B2 * | 9/2002 | Moeller | A24C 5/3412 |
| | | | | 324/633 |
| 2002/0121906 | A1 * | 9/2002 | Tobias | G01N 22/04 |
| | | | | 324/639 |
| 2002/0130670 | A1 * | 9/2002 | Moller | A24C 5/3412 |
| | | | | 324/640 |
| 2004/0236436 | A1 * | 11/2004 | Draghetti | A24C 5/00 |
| | | | | 700/1 |
| 2018/0027868 | A1 * | 2/2018 | Mueller | A24C 5/3412 |

FOREIGN PATENT DOCUMENTS

| | | | |
|---|---|---|---|
| DE | 102015119453 | A1 | 5/2017 |
| EP | 0259071 | A2 | 3/1988 |
| WO | 2016/162292 | A1 | 10/2016 |
| WO | 2017/080982 | A1 | 5/2017 |

OTHER PUBLICATIONS

PCT/EP2020/061304; International Search Report and Written Opinion; date of mailing Aug. 3, 2020 (13 pages).
PCT/EP2020/061304; English translation of International Search Report; date of mailing Aug. 3, 2020 (2 pages).
JP 2022501364; Filed Sep. 18, 2019; Notification of Reasons for Refusal; Dispatch Date Feb. 27, 2024 (4 pages).
JP 2022501364; Filed Sep. 18, 2019; English translation of Notification of Reasons for Refusal; Dispatch Date Feb. 27, 2024 (4 pages).

* cited by examiner

CIGARETTE MACHINE COMPRISING A SUCTION BELT CONVEYOR

CROSS REFERENCE TO RELATED INVENTION

This application is a national stage application pursuant to 35 U.S.C. § 371 of International Application No. PCT/EP2020/061304, filed on Apr. 23, 2020, which claims priority to, and benefit of, German Patent Application No. 20 2019 103 894.2, filed Jul. 15, 2019, the entire contents of which are hereby incorporated by reference.

FIELD OF TECHNOLOGY

The present invention relates to a cigarette machine comprising a suction belt conveyor for the tobacco-processing industry.

BACKGROUND

It is sufficiently well known that the density of an endless tobacco rod during production on a cigarette machine and/or on a rod maker can be monitored with electromagnetic measuring apparatuses. In such cases, the use of tobacco on the machine is monitored with the aid of a measured density signal, wherein this measurement is conventionally carried out after the formation of the endless rod when the tobacco is in rod form and is already wrapped in paper.

In the context of new tobacco products that heat tobacco and do not burn it, so-called heat-not-burn products, for example, the production of endless tobacco rods is carried out using a metal foil. In products such as this, the endless tobacco rod is thus surrounded by metal foil, and so an electromagnetic measuring device, and in particular a microwave measuring device, can no longer be used for measurement.

A suction belt conveyor of a rod maker in the tobacco-processing industry has become known from WO 2016/162292 A1. The suction belt conveyor serves to feed material, in particular tobacco, in a downwardly open rod guide channel to the rod formation apparatuses. The rod guide channel is delimited laterally by two channel cheeks that are disposed opposite each other. A suction belt is arranged at the top of the rod guide channel, and so the channel cheeks and the suction belt form a U-shaped boundary for the rod guide channel. In a suction belt conveyor of this type, it has been proposed that at least one electromagnetic measuring apparatus be integrated into the channel cheeks of the suction belt conveyor to determine the properties of the conveyed material in at least one position along the conveying path. The measurement is already performed in the rod guide channel of the suction belt conveyor in order to obtain a measurement of material properties at an early stage without any disturbing influences of the paper. With regard to the required suction belt replacement, integration into the channel cheeks is considered advantageous. However, the integration of the sensors into the channel cheeks is disadvantageous in light of the measuring accuracy that can be achieved, in particular when measuring the density of the tobacco in the guide channel The invention addresses the problem of providing a cigarette machine comprising a suction belt conveyor for the tobacco-processing industry, the electromagnetic measuring apparatus of which provides measurement results that are reliable with respect to the mass of the transported material.

BRIEF SUMMARY OF THE INVENTION

In an embodiment, a cigarette machine comprises a suction belt conveyor and is intended for the tobacco-processing industry. The suction belt conveyor has a rod guide channel, which is delimited on one side by the suction belt that conveys the material and, adjacent to it, by two channel cheeks that are disposed opposite each other. An electromagnetic measuring apparatus with a resonator is likewise provided. The material transported in the rod guide channel, in particular the tobacco, interacts with the electromagnetic field in the resonator of the measuring apparatus. The measured signals are dependent upon the dielectric properties of the material. The resonator comprises two resonator halves, a first of which is arranged on the side of the rod guide channel with the conveying suction belt, and the second of which is arranged on the side opposite the first resonator half. According to the invention, the two resonator halves are not integrated into the channel cheeks. The suction belt conveyor according to the invention is based on the technical knowledge that the measurement, in particular of the mass of the material, places high demands on the homogeneity of the measuring field. For a precise measurement, the measuring field must be as homogeneous as possible in the area of the material or in the area of the conveying suction belt. With the vertical spatial arrangement of the resonator halves of the cavity resonator according to the invention, a higher field homogeneity can be achieved at the location of the tobacco than with a possible horizontal arrangement. More accurate and reliable measurement results can be achieved in this way.

In a preferred embodiment, the electromagnetic measuring apparatus is configured as a microwave resonator, the resonator cavity of which is formed by the two resonator halves that are disposed opposite each other. In this type of microwave resonators, the resonator halves are normally rigidly connected, and so the entire resonator is U-shaped or horseshoe-shaped in order to achieve stable resonance characteristics with respect to the resonance frequency and the Q factor, or half-power width, of the resonance curve. In the solution with two separate resonator halves according to the invention, care must be taken to ensure that they are positioned as exactly opposite each other as possible. The signal of a microwave resonator is proportional to the mass of the material to be measured in the measuring field. The volume of the material to be measured cannot be measured with this measuring apparatus. Therefore, it is possible to determine a density only if the volume of the material that is to be measured is constant or known. This is the case with cigarette production, since the diameter of the cigarettes is constant and a calibration of density can be performed. Strictly speaking, the mass is measured for a unit of length and converted to mass per unit of volume by the principle of volume constancy. By integrating the density signal over one cigarette length, the mass of the tobacco being used is obtained.

In the case of measurement on a suction belt, it can also be assumed that the transported tobacco will be reformed into an endless cigarette rod with the same linear mass distribution and thus define a density measurement, even if the measurement signals carry out a mass measurement. The term "mass measurement" and the term "density measurement" are used synonymously in the present application.

It has been found to be advantageous to position the two resonator halves such that they are centered between the lateral channel cheeks. The channel cheeks are preferably made of ceramic or plastic, at least in the area of the electromagnetic measuring apparatus. They exert a constant influence on the measuring field of the resonator, which can be eliminated by a taring measurement of the empty resonance values.

In a preferred embodiment, the first resonator half is arranged adjacent to the suction belt, preferably on the suction belt conveyor, and can be positioned together with the suction belt conveyor. The background to this is that the suction belt itself is a wear part that is replaced regularly, such as after each shift. To this end, the entire suction belt conveyor, including the first half of the resonator, is moved upwards. Once the suction belt has been replaced, the suction belt conveyor is returned to its original position. For this purpose, the first resonator half can be connected to the movably mounted suction belt conveyor, for example. The first resonator half is thus moved together with the suction belt conveyor and brought back into position.

The second half of the resonator is preferably positioned adjacent to the rod guide channel It is preferably arranged on the machine. The second resonator half can remain mounted in position during a replacement of the suction belt or while other actions are carried out on the suction belt conveyor.

Preferably, the electromagnetic measuring apparatus is located between the trimming discs and the rod formation zone. Because the insertion of the mass of the tobacco into the endless tobacco rod is controlled by the trimming discs, the tobacco in this area has the mass profile that later appears in the finished formed rod. For accurate and temporally constant measurement results, it has proven advantageous to provide a heating apparatus on the electromagnetic measuring apparatus to heat one or both of the resonator halves. It is also possible to heat to a constant temperature by means of a control system. Deviations in the measurement signals are prevented by heating.

Furthermore, it has proven advantageous to provide a compressed air apparatus, with which the resonator halves can be cleaned. In particular, cleaning can also be carried out during operation so as to avoid measurement errors caused by residues. The electromagnetic measuring apparatus is preferably designed to measure the mass/density and/or the moisture of the conveyed material.

In a preferred embodiment, the suction belt conveyor according to the invention is used in a cigarette machine. In this instance, the measurement results of the electromagnetic measuring apparatus are used to measure a tobacco mass. The tobacco mass is preferably measured in relation to a reference length and/or to a tobacco product. In particular, owing to the high measuring accuracy achieved by the arrangement of the sensor halves, it is also possible to regulate the tobacco mass by means of the trimming discs with the aid of the measurement results.

In microwave resonator measurement, the resonance parameters that are measured on the product to be measured are always related to the resonance parameters of the empty resonator. A taring empty measurement is performed for this purpose, which is usually carried out with the resonator empty. This is not possible in this case, since the suction belt is permanently located in the resonator.

In a preferred embodiment, a taring measurement is therefore performed on an empty suction belt. The taring measurement is performed either at a position or in a defined area, at several positions or in several defined areas, or for at least one complete revolution of the suction belt. The taring measurement determines the contribution of the empty measuring area to the measurement signals. The suction belt located in the measurement area makes a contribution, for example, but so do the channel walls and the space between the resonator halves. Using the taring measurement, the measured values recorded later with tobacco transported by the suction belt are corrected to determine reliable mass and moisture values for the tobacco.

It has proven to be especially advantageous to configure the rod guide channel in such a way that closing it initiates a taring measurement. It is ensured in this way that a taring measurement is performed again after the rod guide channel is closed, when the two resonator halves can change their relative position to each other.

In a further preferred embodiment, a plausibility check of the taring measurement is performed. For this purpose, the measured values of the new taring measurement are compared with one or previous measured values. If a deviation by more than a predetermined minimum amount occurs, the new measured values are discarded, for example. During automated recording of multiple measurements at different points on the belt, the measured values with the smallest deviation from the previous measured values can be used. This plausibility check has been shown to be especially practicable, since it can repeatedly happen that contaminants, such as crumbs or tobacco residues remain in the rod guide channel during taring measurement and influence the measurement results. Errors of this type can be detected and avoided by performing a comparison with the previous measured values, in particular the previous measured values of a taring measurement. With the aid of the plausibility check, it is also possible to use the measured values that are obtained during the taring measurement for the empty adjustment to automatically carry out the further evaluation without prior manual testing.

A further particular advantage of the disclosed invention is that the influences of a joint in the suction belt can be reliably detected and taken into account. The suction belt is generally designed as a continuously running belt and has a joint, which is generally characterized by a greater material thickness and thus a greater mass per length. To detect the joint in the suction belt, a measurement of the empty suction belt can be made. The measurement of the empty suction belt can certainly also be the taring measurement. During the measurement of the empty suction belt, an evaluation apparatus is configured to detect the joint of the suction belt via peak detection in the measurement signals. Preferably, the evaluation apparatus detects the joint by a rise in a measurement signal that is indicative of the mass and/or a lack of rise in a measurement signal that is indicative of the moisture. Peak detection is based on the knowledge that the higher area density of the suction belt in the absence of tobacco is a sufficient indication of the joint. Of course, even in a suction belt with a plurality of joints, they can be reliably detected.

The increase in mass in the region of the joint can be measured on the empty belt, and the measured tobacco masses at this location on the belt are corrected during production operation.

BRIEF DESCRIPTION OF THE DRAWINGS

A preferred embodiment of the invention with the arrangement of the two resonator halves is described in greater detail below. The following is shown:

FIG. 1b illustrates a close-up perspective view of a portion of the embodiment of FIG. 1a;

5

Figure 2B:
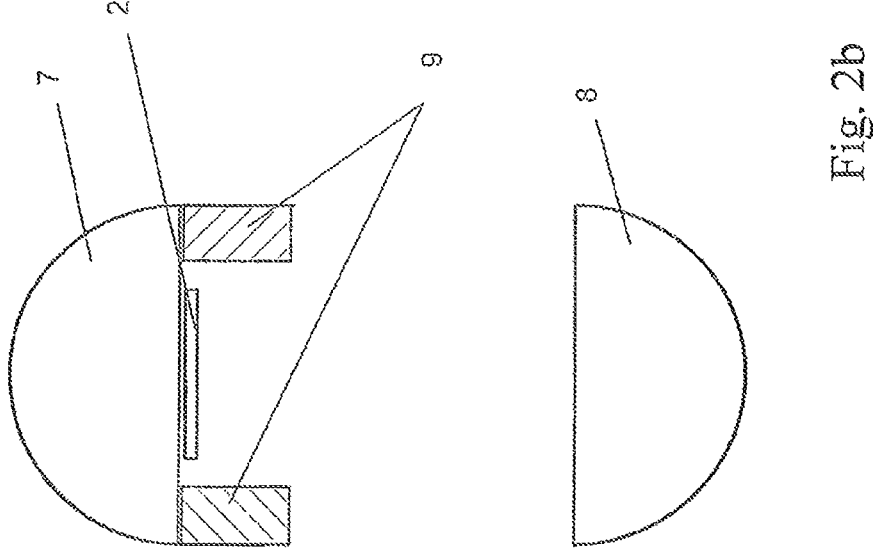
Figure 2A:
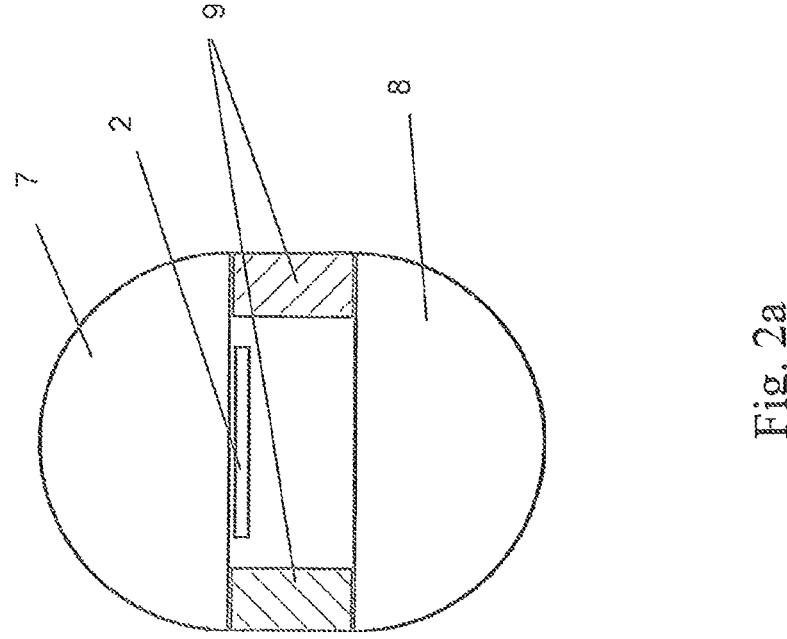
Figure 3:
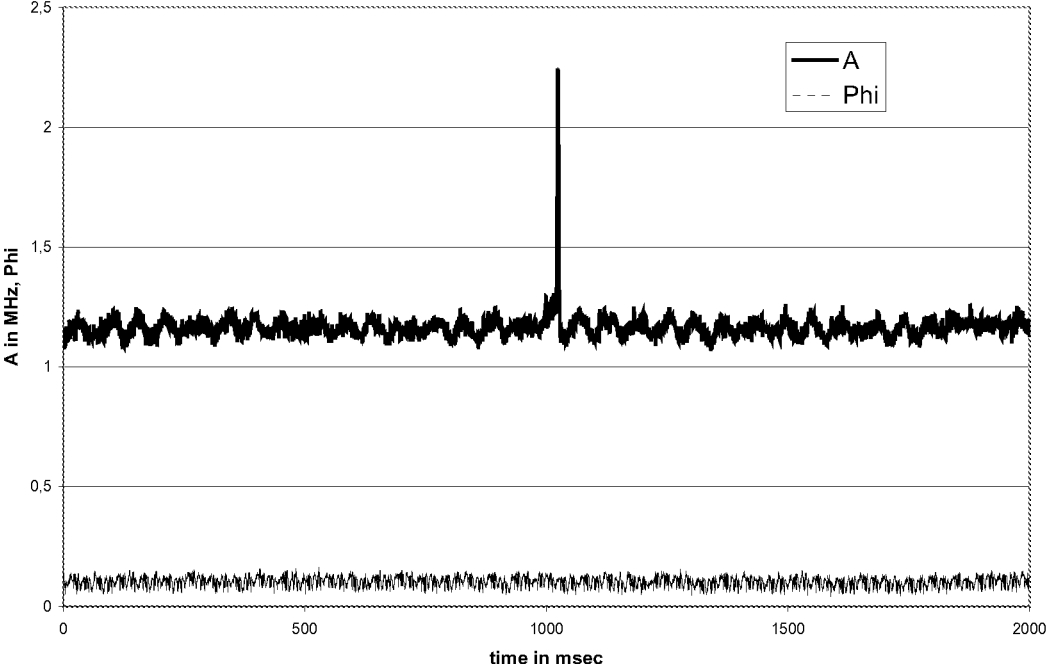

FIG. 2a schematically illustrates an embodiment of the resonator halves on the conveyor channel in a closed position FIG. 2b schematically illustrates an embodiment of the resonator halves of FIG. 2b in an opened position; and FIG. 3 illustrates the curve of the measurement signals of an empty belt with a joint.

DETAILED DESCRIPTION OF THE INVENTION

Figure 1A:
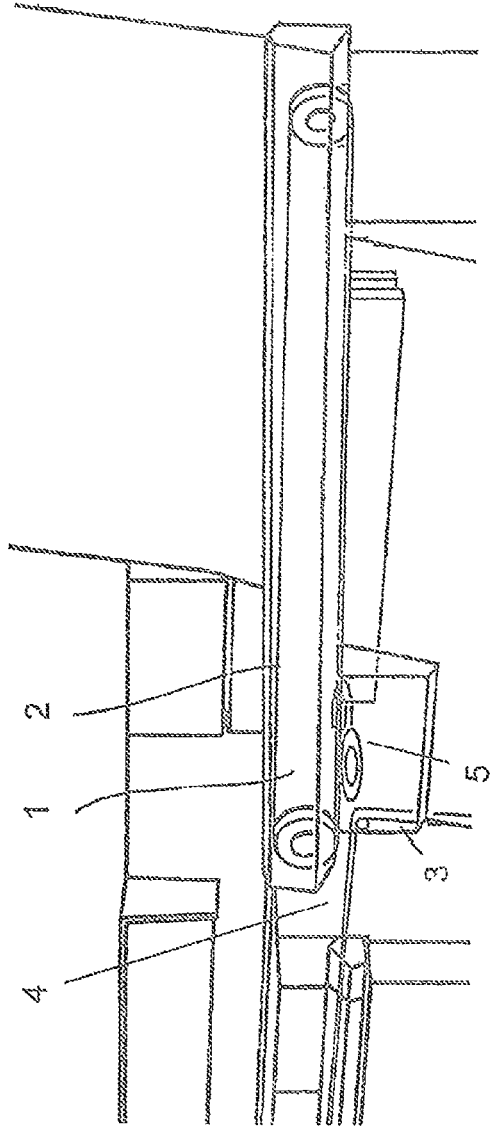
FIG. 1a illustrates a perspective view of an embodiment of a suction belt conveyor comprising a suction belt and a measuring apparatus.
Figure 1B:
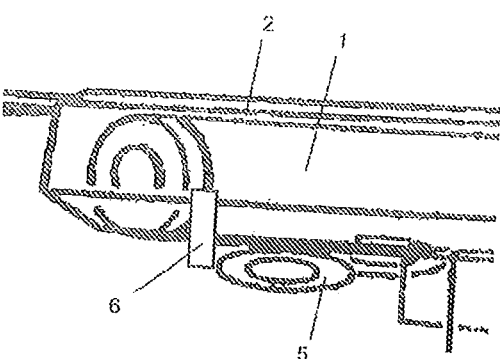

FIG. 1 shows a suction belt conveyor 1 comprising a suction belt 2 that extends in the conveying direction. The tobacco that is to be processed is conveyed into a zone 4 for rod formation by means of the suction belt 2. Paper 3 is supplied to the zone 4. The trimming discs 5 are arranged near the rod formation zone. The detailed view in FIG. 1b from the head end of the suction belt conveyor shows the suction belt conveyor 1 with its suction belt 2 and the trimming discs 5. In this instance, a sensor position 6 is arranged near the end of the suction belt conveyor, for example. The trimming discs in a cigarette machine are the apparatuses for controlling the tobacco mass that is inserted. They are arranged in pairs and positioned on both sides of the endless tobacco rod. They trim the transported tobacco at a particular height, wherein the mass is controlled either by varying the vertical position of the discs or by modifying the height of the belt relative to the trimming discs. Preferably, two trimmer discs that are disposed opposite each other are arranged on each channel.

The sensor system 6 represented here is a microwave cavity resonator consisting of two resonator halves. Of these two resonator halves, the first resonator half is arranged above the suction belt, while the second resonator half is arranged below the suction belt and preferably also below the lateral channel cheeks.

Measuring the density of the tobacco on the suction belt places high demands on the homogeneity of the measuring field. For a precise measurement of the density, the measuring field in the area of the tobacco must be as homogeneous as possible. A high degree of field homogeneity is achieved in the area of the measured material by using a microwave resonator comprising two resonator halves, with the suction belt positioned flat between them, thereby permitting accurate measurement results to be obtained.

The suction belt transporting the tobacco is a wear part that must be replaced regularly, for example once per shift. For this purpose, the entire suction belt conveyor is mechanically moved upward to permit the suction belt to be replaced. Once the suction belt has been replaced, the suction belt conveyor is returned to its starting position with a high degree of mechanical precision. The suction belt has a uniform distribution of material throughout, which makes a constant contribution to the measurement signals during a density measurement. This constant contribution is eliminated by the taring empty measurement. Only at a joint is the suction belt not homogeneous, and this can cause a disturbance in the measurement signals.

The sensor 6 comprises a microwave cavity resonator consisting of two half-shells. One half-shell is positioned directly below the lower opening of the rod guide channel and is fastened in the cigarette machine. The second half-shell is positioned with the suction belt conveyor directly above the suction belt and is moved together with the suction belt conveyor when the belt is replaced. The resonator does not function while the suction belt conveyor is moving. As a cavity resonator, the resonator is constructed as small as possible in order to concentrate the measurement field in the transport channel and to interfere as little as possible with the functioning of the suction belt.

FIG. 2a shows the closed arrangement with a lower resonator half 8 and an upper resonator half 7. The upper resonator half 7 in this instance is the first resonator half, which is arranged on the side of the rod guide channel with the conveying suction belt. The second resonator half 8 is arranged on the opposite, open side of the rod guide channel. The rod guide channel is delimited on the sides by the channel cheeks 9. The upper and second resonator halves 7 and 8 are shown with a semicircular housing shape in FIGS. 2a-b, wherein the measuring range between them extends over the entire area between the channel cheeks 9 and thus also includes the suction belt 2. FIG. 2b shows the open position, in which the suction belt conveyor is raised together with the first resonator half 7 in order to replace the suction belt 2, for example. A greater distance is created between the first resonator half 7 and the second resonator half 8 in this way, and so a measuring operation is not possible in the open position. In order to precisely remount the upper or the second resonator half 7, 8, fitting means can be provided on the channel cheeks, against which the two resonator halves are tensioned against each other into their exact positions, for example with force, thereby ensuring precise relative positioning.

The coupling and decoupling of the microwave signals preferably occurs on the second resonator half 8, which is securely attached to the cigarette machine. The channel cheeks 9 are made of plastic or ceramic, at least in the area of the sensor, and exert a constant influence on the measuring field of the resonator, which can be eliminated by a taring measurement of the empty resonance values.

As is also illustrated with reference to FIG. 1b, the trimming discs 5 are located near the zone 4 in which the rod forming is carried out. Rod forming occurs outside of the suction belt conveyor, wherein the trimming disks separate excess tobacco from the suction belt. A well-suited location for the placement of the sensor system is between the trimming discs 5 and the rod formation zone 4.

The resonator can be encapsulated and heated in order to minimize the influence of temperature fluctuations on the measurement at the location of the measuring apparatus. The heating of the resonator is controlled during operation such that the resonator always has a constant temperature. In the arrangement according to the invention, the risk arises that tobacco will accumulate on the lower half shell during production. It can also be removed during operation by means of compressed air.

FIG. 3 shows the curve of the measurement signals of an empty suction belt with a joint. The measured values A [MHz] and Phi are plotted. The measured value A refers here to the resonance value shift as it occurs compared to a measurement of the empty resonator. This resonance frequency shift depends upon the mass of the materials located in the measurement area between the resonator halves. Phi denotes a mass-independent moisture value, which can be determined, for example, from the quotient of the resonance frequency shift and the resonance broadening. FIG. 3 shows that a peak in the A value occurs at the joint of the suction belt, while the phi value remains substantially unchanged. This behavior of the measurement signals can be used to detect the joint in the suction belt during the taring measurement. A position determination can be carried out in this way so that, if an uneven distribution of tobacco subsequently occurs, for example, the influence of the joint can be taken into account using its position. In the manufacture of 'heat-not-burn' products, the endless tobacco rod is usually filled homogeneously, and so a position determination can be omitted, and the increase in density caused by the joint can be immediately recognized in the A values. At the same time, a minimum for the microwave moisture value phi arises because a different mass ratio occurs in the joint between the suction tape and the tobacco, in which the relative mass of the suction belt to tobacco is greater than in the other positions of the suction belt. The increase in mass in the region of the joint can be measured on the empty belt, and the measured tobacco masses at this location on the belt are corrected during production operation. Position tracking by means of the shaft encoder signal of the cigarette machine can also be utilized to correct the signal of the joint.

The invention claimed is:

1. A cigarette machine comprising:
    a movably mounted suction belt conveyor including a rod guide channel, wherein the rod guide channel is delimited on one side by a material-conveying suction belt;
    two channel cheeks positioned opposite one another and configured to adjoin the rod guide channel; and
    an electromagnetic measuring apparatus comprising a resonator, wherein the resonator comprises,
        a first resonator half positioned on the side of the rod guide channel with the movably mounted suction belt conveyor, and
        a second resonator half which is provided on the side which is situated opposite the first resonator half and is fixedly attached to the cigarette machine,
    wherein the first resonator half is connected to the movably mounted suction belt conveyor and is configured to be movable along with the movably mounted suction belt conveyor.

2. The cigarette machine according to claim 1, wherein the electromagnetic measuring apparatus is a microwave resonator comprising a resonator cavity defined by the first resonator half and the second resonator half.

3. The cigarette machine according to claim 2, wherein microwave signals are coupled and decoupled at the second resonator half.

4. The cigarette machine according to claim 1, wherein the first resonator half is positioned adjacent to the movably mounted suction belt conveyor.

5. The cigarette machine according to claim 1, wherein the second resonator half is positioned adjacent to the rod guide channel.

6. The cigarette machine according to claim 1, further comprising:
    a rod formation zone; and
    one or more trimming discs,
    wherein the electromagnetic measuring apparatus is positioned between the one or more trimming discs and the rod formation zone.

7. The cigarette machine according claim 1, wherein the electromagnetic measuring apparatus is configured to heat at least one of the first resonator half and the second resonator half.

8. The cigarette machine according to claim 1, further configured to clean the first resonator half and the second resonator half.

9. The cigarette machine according to claim 1, wherein the electromagnetic measuring apparatus is configured to measure at least one of: (1) a mass; (2) a density; and (3) a moisture content of material conveyed on the movably mounted suction belt conveyor.

10. The cigarette machine according to claim 9, wherein measurement results from the electromagnetic measuring apparatus are used to measure a tobacco mass in relation to a reference length.

11. The cigarette machine according to claim 10, wherein the tobacco mass is regulated using the measurement results.

12. The cigarette machine according to claim 10, wherein a taring measurement is configured to be carried out on an empty movably mounted suction belt conveyor.

13. The cigarette machine according to claim 12, wherein a closing of the rod guide channel is configured to initiate the taring measurement.

14. The cigarette machine according to claim 12, wherein the taring measurement is performed in at least one position of the movably mounted suction belt conveyor and is compared with one or more previously measured values, wherein the taring measurement is discarded if a deviation by more than a predetermined minimum amount occurs.

15. The cigarette machine according to claim 12, wherein the taring measurement is carried out in at least two positions on the movably mounted suction belt conveyor and the measured values are compared with one or more previous measured values, and wherein a measured value with a smallest deviation from the previous measured values is adopted as the measured value.

16. The cigarette machine according to claim 1, further configured to detect a joint of the movably mounted suction belt conveyor using a peak detection in measurement signals.

17. The cigarette machine according to claim 16, wherein a mass value of the joint is determined during an empty measurement and is used to correct a measured mass signal at the joint.

18. The cigarette machine according to claim 16, further configured to detect the joint when measuring an empty movably mounted suction belt conveyor by one of: (1) a rise in a measurement signal that is indicative of a mass; and (2) a lack of a rise in a measurement signal that is indicative of moisture.

19. The cigarette machine according to claim 16, wherein the evaluation apparatus is configured to detect the joint when measuring a filled movably mounted suction belt conveyor by one of: (1) a rise in a measurement signal that is indicative of a mass; and (2) a decline in a measurement signal that is indicative of moisture.

20. The cigarette machine of claim 1, wherein the movably mounted suction conveyor comprises a suction belt, and wherein the movably mounted suction conveyor and the first resonator half are configured to be mechanically moved together relative to the second resonator half in order to replace the suction belt.

* * * * *